United States Patent
Pauli et al.

(10) Patent No.: US 9,809,389 B2
(45) Date of Patent: Nov. 7, 2017

(54) FORCE MEASURING UNIT AND SYSTEM FOR MEASURING CHAIN FORCES

(71) Applicant: CATERPILLAR GLOBAL MINING EUROPE GMBH, Lunen (DE)

(72) Inventors: Simon Pauli, Hannover (DE); Detlef Hahn, Lunen (DE); Stefan Kratochvil, Lunen (DE); Christian Hauck, Dortmund (DE); Mirko Skowron, Herne (DE); Marco Ahler, Muhlheim (DE); Dominik Bittner, Munster (DE); Manfred Ziegler, Erftstadt (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 0 days.

(21) Appl. No.: 15/101,210

(22) PCT Filed: Nov. 25, 2014

(86) PCT No.: PCT/EP2014/003141
§ 371 (c)(1),
(2) Date: Jun. 2, 2016

(87) PCT Pub. No.: WO2015/086110
PCT Pub. Date: Jun. 18, 2015

(65) Prior Publication Data
US 2016/0304286 A1      Oct. 20, 2016

(30) Foreign Application Priority Data

Dec. 9, 2013  (EP) .................................... 13196300

(51) Int. Cl.
*B65G 23/44*    (2006.01)
*B65G 43/00*    (2006.01)
(Continued)

(52) U.S. Cl.
CPC ................ *B65G 23/44* (2013.01); *G01L 1/00* (2013.01); *G01L 1/04* (2013.01)

(58) Field of Classification Search
CPC ........ B65G 43/00; B65G 23/44; B65G 17/30; G01L 5/00; G01L 5/10; G01L 1/00; G01L 1/04
(Continued)

(56) References Cited

U.S. PATENT DOCUMENTS 3,976,851 A * 8/1976 Redon ..................... B66C 15/00
                                                           200/85 R
4,283,942 A * 8/1981 Fishfader ................ G01L 5/102
                                                           73/862.632
(Continued)

FOREIGN PATENT DOCUMENTS

DE         19905461      8/2000
EP         0003685       8/1979
(Continued)

OTHER PUBLICATIONS

European Search Report dated May 7, 2014.
International Search Report dated Feb. 6, 2015.

*Primary Examiner* — James R Bidwell

(57) ABSTRACT

A force measuring unit for measuring a force applied to an individual chain link of a chain strand is used in underground mining applications. The force measuring unit may include a housing having a first end configured to be contacted by a first chain link leg and a second end configured to be contacted by a second chain link leg, and a distance measuring device accommodated within the housing and configured to measure an actual distance between the first chain link leg and the second chain link leg. The distance measuring device may include a first unit part configured to be contacted by the first chain link leg and a second unit part configured to be contacted by the second chain link leg.

14 Claims, 7 Drawing Sheets

(51) Int. Cl.
  *G01L 1/00* (2006.01)
  *G01L 1/04* (2006.01)
(58) Field of Classification Search
  USPC .......... 198/810.01, 813; 73/862.69, 862.391
  See application file for complete search history.

(56) References Cited

U.S. PATENT DOCUMENTS

| | | | | |
|---|---|---|---|---|
| 4,605,829 | A * | 8/1986 | Zacharias | G01G 19/18 73/862.642 |
| 5,224,388 | A * | 7/1993 | Pratt | G01G 19/18 73/765 |
| 7,418,875 | B2 * | 9/2008 | Kohno | G01L 5/102 198/502.3 |
| 8,636,140 | B2 * | 1/2014 | Tout | B65G 23/44 198/814 |
| 8,973,742 | B2 * | 3/2015 | Tout | B65G 23/44 198/810.04 |
| 2011/0024268 | A1 | 2/2011 | Merten et al. | |

FOREIGN PATENT DOCUMENTS

| | | |
|---|---|---|
| GB | 1166866 | 10/1969 |
| GB | 2034483 | 6/1980 |

* cited by examiner

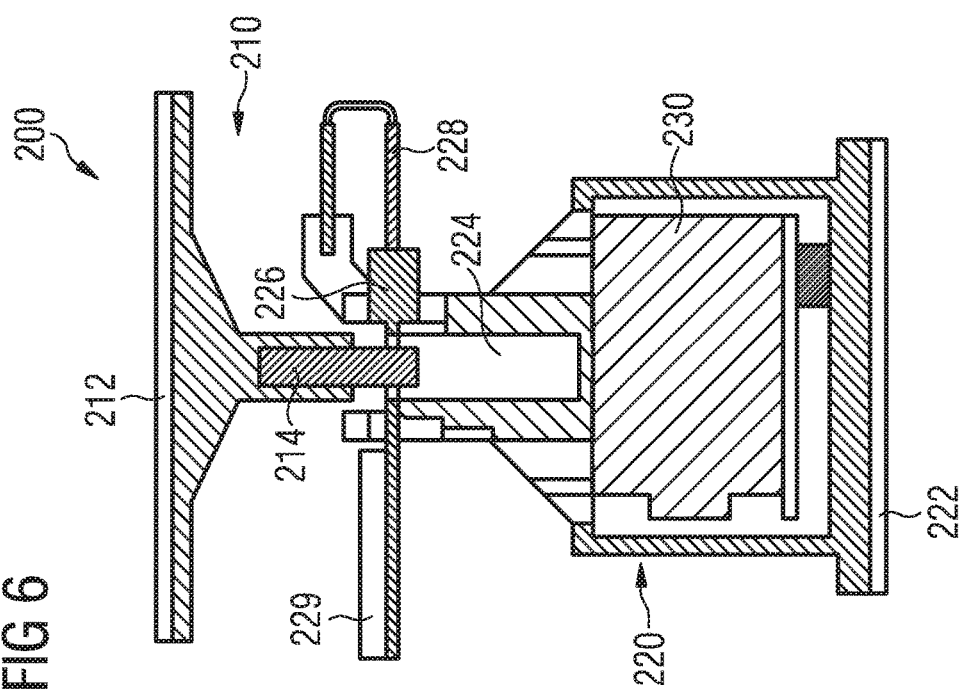
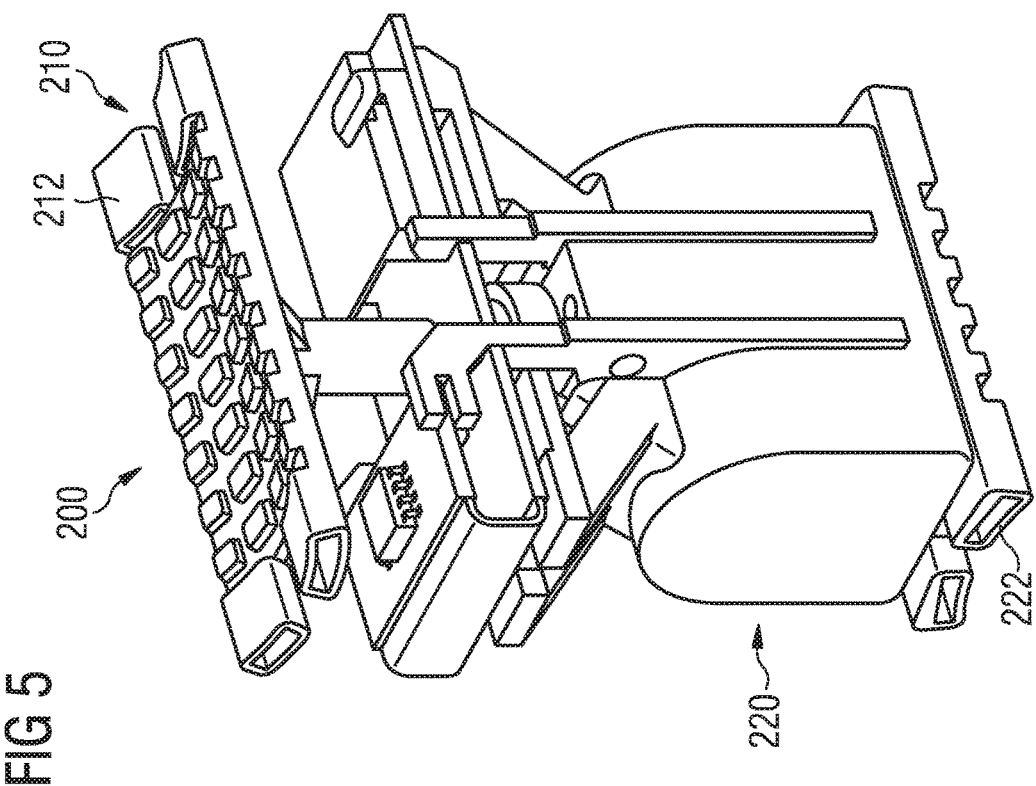

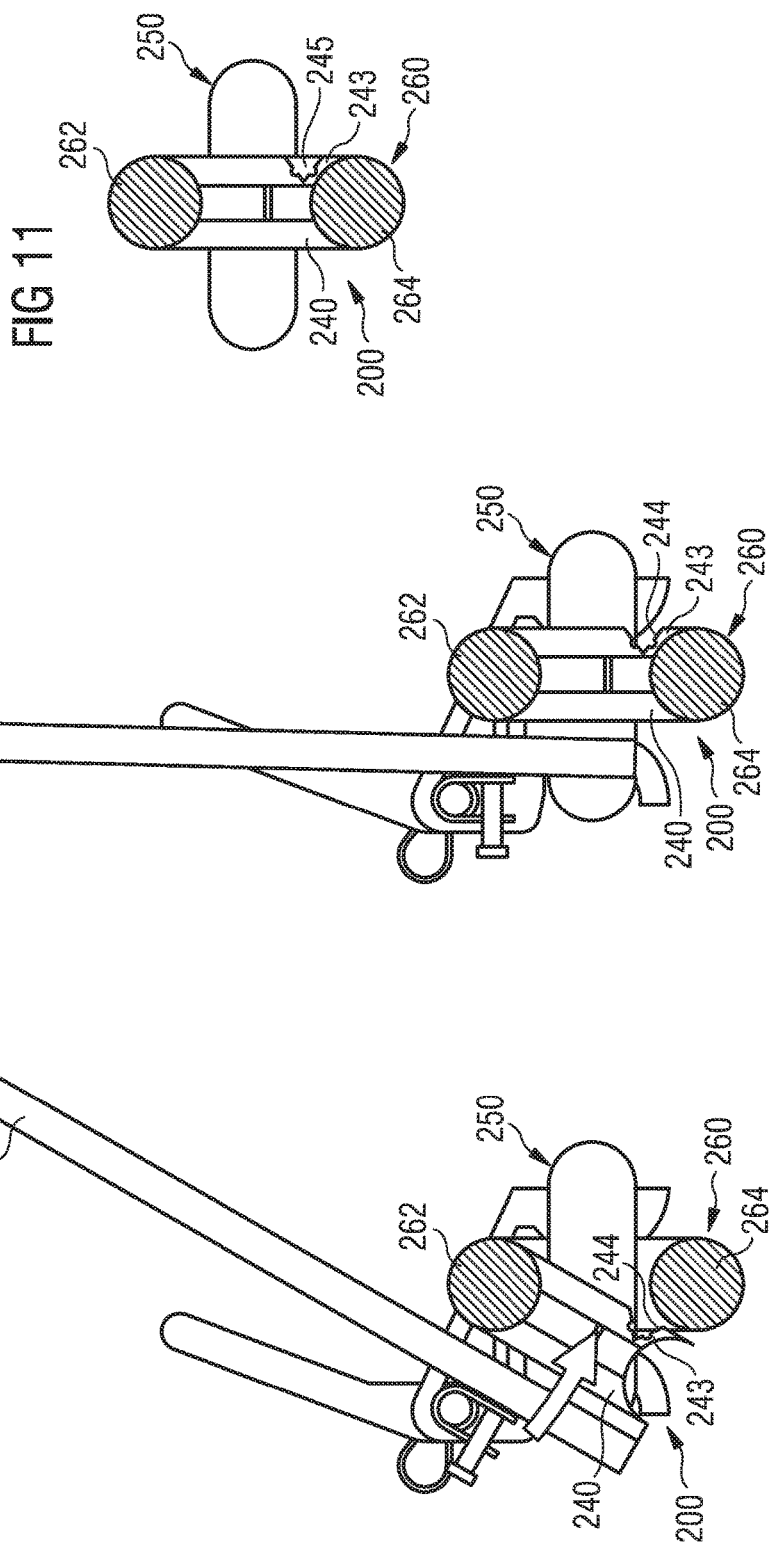

FORCE MEASURING UNIT AND SYSTEM FOR MEASURING CHAIN FORCES

CLAIM FOR PRIORITY

This application is a U.S. National Phase entry under 35 U.S.C. §371 from PCT International Application No. PCT/EP2014/003141, filed Nov. 25, 2014, which claims benefit of priority of European Patent Application No. 13196300.1, filed Dec. 9, 2013, all of which are incorporated herein by reference.

TECHNICAL FIELD

The present disclosure generally relates to a force measuring unit and system for measuring chain forces of a chain strand used in underground mining applications, particularly for measuring the force at an individual chain link of the chain strand. The present disclosure further relates to a method for determining a force of at least one chain link of a chain strand including a plurality of chain links engaging each other. Additionally, the present disclosure relates to an installation tool for fitting the force measuring unit into the chain link.

BACKGROUND

For monitoring the chain force of a chain strand of, for instance, a chain scraper conveyor or a mining plow used in underground mining, it is desired to determine or measure the force of the chain strand and, preferably, the chain force at each chain link.

For example, US 2011/0024268 A1 discloses an extraction device, particularly for mining, and a method for controlling the extraction device. The extraction device has two drive stations and a drive chain which extends between the sprockets thereof. For detecting a hanging chain or chain wear to a conveyor chain of a conveyor device or to a plow chain of a plow device, magnetic sensor units for detecting at least one chain condition of the drive chain are provided. Each sensor unit includes a transmitter, which is formed by a static or dynamic magnetic field generator, and a detector field, which is provided with a plurality of magnetic field detectors, as a detector. The detector and the transmitter are arranged to the side of a passage for the run of the drive chain that is to be scanned.

Further, DE 199 05 461 B4 discloses a force measuring device for continually capturing the chain force of a chain strand of a chain scraper conveyor. It is disclosed that the distance change of two chain link legs are measured, which distance change is indicative of the force applied to each chain link.

EP 0 003 682 A2 discloses a load indicating device adapted to be placed between a load and a hoisting cable of a crane. The load indicating device consists of an annular member of a high tensile steel and an electric displacement transducer placed between the portions of the annular member.

U.S. Pat. No. 4,283,942 A discloses a load measuring device for use with a link, including a load cell for mounting across the link.

The present disclosure is directed, at least in part, to improving or overcoming one or more aspects of prior systems.

SUMMARY OF THE DISCLOSURE

According to an aspect of the present disclosure, a force measuring unit for measuring a force applied to an individual chain link of a chain strand used in underground mining applications is disclosed. The chain strand may include a plurality of chain links engaging each other. Each chain link may have a first chain link leg and a second chain link leg opposite to the first chain link leg. The disclosed force measuring unit may comprise a housing having a first end configured to be contacted by the first chain link leg and a second end configured to be contacted by the second chain link leg. The housing may be elastically deformable such that a distance variation between the first chain link leg and the second chain link leg is possible. The force measuring unit may further comprise a distance measuring device accommodated within the housing and configured to measure an actual distance between the first chain link leg and the second chain link leg. The distance measuring device may include a first unit part configured to be contacted by the first chain link leg and a second unit part configured to be contacted by the second chain link leg. Due to the distance variation between the first chain link leg and the second chain link leg caused by the force applied to the chain strand, the first unit part and the second unit part may move relatively to each other, such that the actual distance between the first and second chain link legs can be measured.

According to another aspect of the present disclosure, a chain force measuring system for measuring the chain force of a chain strand of an extraction device or a plow device used in underground mining applications may comprise at least one force measuring unit of the present disclosure, at least one signal receiving unit configured to receive signals from the at least one force measuring unit, and a control unit communicating with the at least one signal receiving unit and configured to process the signals provided by the at least one signal receiving unit for deriving the chain force. The at least one force measuring unit may be mounted to a chain link of the chain strand.

According to another aspect of the present disclosure, an extraction device for mining coal, minerals, hard rock, or the like, may comprise a first drive station including a first sprocket, a second drive station spaced apart from the first drive station and including a second sprocket, at least one chain strand including a plurality of chain links engaging each other and running around the first sprocket and the second sprocket in the form of an upper run and a lower run, and a chain force measuring system according to the present disclosure.

According to another aspect of the present disclosure, a method for determining a force of at least one chain link of a chain strand including a plurality of chain links engaging each other is disclosed. Each chain link may have a first chain link leg and a second chain link leg opposite to the first chain link leg. The method may comprise transferring a distance variation between the first chain link leg and the second chain link leg into a relative movement between a magnet coupled to the movement of the first chain link leg and a magnetic field sensor coupled to the movement of the second chain link leg, measuring a magnetic field caused by the magnet, and, based on the measured magnetic field, deriving the force at the chain link.

In some embodiments, the force measuring unit may further comprise a magnet provided at the first unit part, and a magnetic field sensor provided at the second unit part and configured to detect a magnetic field caused by the magnet. Due to the relative movement between the first unit part and the second unit part, the magnet may move relatively to the magnetic field sensor, thereby causing a variation of the detected magnetic field.

A chain link in the meaning of the present disclosure may comprise a first chain link leg and a second chain link leg opposite to the first chain link leg. The first and second chain link legs are usually straight portions running substantially parallel to each other and being connected to each other via curved portions. Thus, the chain link may have an oval ring shape with a free portion in the center, into which the exemplary disclosed force measuring unit may be mounted and fitted.

Other features and aspects of this disclosure will be apparent from the following description and the accompanying drawings.

BRIEF DESCRIPTION OF THE DRAWINGS

FIG. 5 depicts a perspective view of an exemplary disclosed force measuring unit;

FIG. 6 depicts a cut view of the force measuring unit shown in FIG. 5;

FIG. 9 illustrates a first installation step of installing a force measuring unit into a chain link using an installation tool;

FIG. 10 illustrates a second installation step of installing the force measuring unit into the chain link;

FIG. 11 illustrates a third installation step of installing the force measuring unit into the chain link;

DETAILED DESCRIPTION

Figure 1:
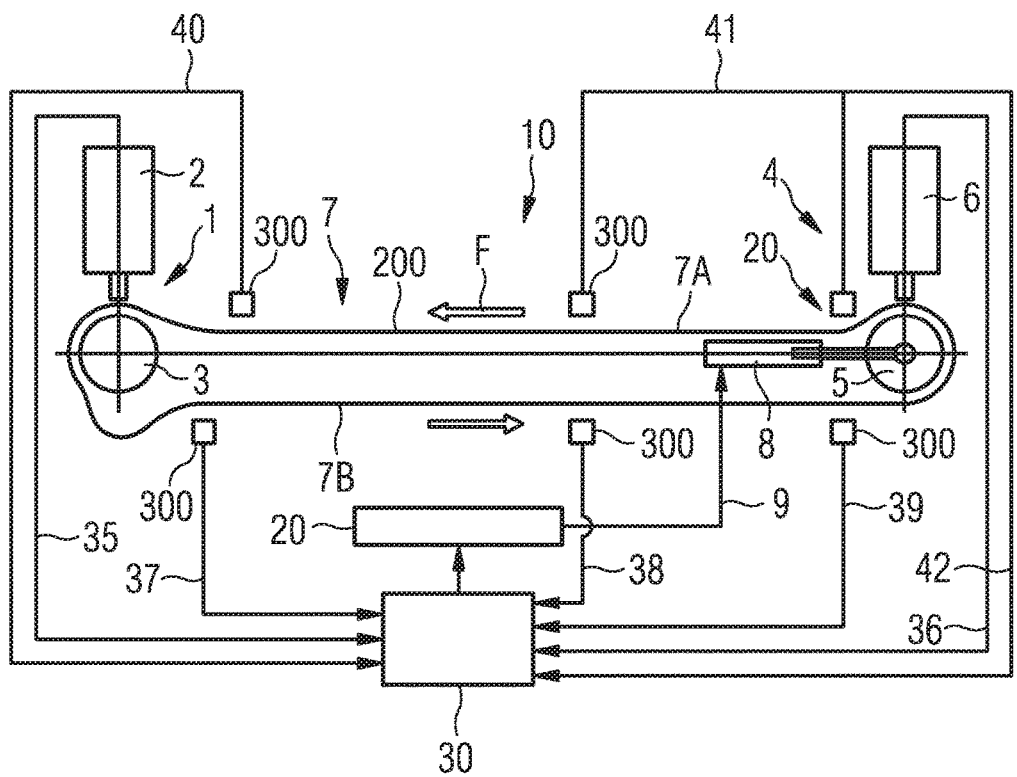
FIG. 1 schematically shows an extraction device for underground mining in the form of a chain scraper conveyor.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based at least in part on the realization that providing a force measuring unit, which may be installed to and de-installed from a chain link of a chain strand, may provide greater flexibility and accuracy with respect to measure the chain force. In some embodiments, the force measuring unit may be at least partially clamped between a first chain link leg of a chain link and a second chain link leg of the chain link. Particularly, the force measuring unit may include a housing accommodating a distance measuring device for measuring the distance between the first and second chain link legs and a potting material potted within a free space provided between the housing and the distance measuring device. The housing and the potting material may be soft enough to allow a relative movement between the first and second chain link legs, but may be also strong enough to withstand the rough environment specifically present in underground mining applications.

The present disclosure may be based at least in part on the realization that measuring a magnetic field change of a relative movement between a magnet coupled to the movement of a first chain link leg and a magnet sensor coupled to the movement of a second chain link leg may improve the reliability to accurately determine the force at the respective chain link. Further, the distance variation between the first chain link leg and the second chain link leg may be determined, which may be indicative for the chain link force.

The present disclosure may be further based at least in part on the realization that providing at least one chain link with a force measuring unit may provide information indicative of the force at the respective chain link and, thus, the chain forces at each position of the chain strand running as an endless chain strand about two drive sprockets, especially used in underground mining applications. Therefore, it may be possible to early determine unusual chain load conditions, such as, for instance, a hanging chain, excessive chain wear or excessive chain loads.

The present disclosure may be further based at least in part on the realization that having a disclosed force measuring unit may provide greater flexibility to the disclosed force measuring system. Thus, it may be possible to increase the number of chain links equipped with a disclosed force measuring unit for increasing the accuracy and resolution of the chain load conditions. Therefore, it may be possible to continually measure and monitor, preferably in real time, the chain load conditions and, hence, to adjust, for example, the chain tensioning means or the operation of the extraction or plow devices.

Referring now to the drawings wherein the showings are for the purpose of illustrating preferred and alternative embodiments of the disclosure only and not for the purpose of limiting same. FIG. 1 shows, in a schematic illustration, an extraction device 10, such as a conveyor device, for underground mining. The extraction device 10 includes, in a manner known per se, a first drive station 1 having a schematically illustrated drive motor 2 and a sprocket 3 and, at the other end of the conveyor device 10, a second drive station 4 having a sprocket 5 and an associated drive motor 6. The drive motors 2 and 6 may in principle take any form suitable for the intended purpose and be constructed as synchronous motors, frequency converter motors or similar, and include gears, regulating means, overload clutches and similar.

Between the two sprockets 3, 5 there circulates, in the direction of conveying indicated by the arrow F, an endless scraper chain strand 7, wherein material which has been extracted from an underground longwall using suitable extraction tools is transported on an upper run 7A by means of entrainers in the direction of the drive station 1, which in this case forms the main drive. The upper run of the drive chain 7 that circulates on the sprockets 3, 5 is designated with 7A in FIG. 1, and the return run or no-load run of the drive chain 7 is designated by reference numeral 7B. In the case of an underground conveyor, the drive toward which the upper run 7A runs provides the greater drive power, which is why the risk of hanging chain occurs predominantly in the lower run 7B downstream of the sprocket 3 of the drive station 1, but also in the lower run 7A downstream of the sprocket 5 of the drive station 4.

To compensate for different tension conditions in the chain strand 7, the drive station 4 is allocated a hydraulic tensioning means 8, by means of which the spacing between the sprockets 3, 5 of the drive stations 1, 4 can be varied. The tensioning means 8 is extended or retracted as a function of a control signal from a hydraulic control means 20, indicated by the line 9.

In the case of the extraction device 10, the chain strand 7 takes the form of a two-center chain having horizontal chain links 250 and vertical chain links 260 (see FIGS. 3 and 4) engaging each other and to which entrainers (scrapers) are secured at given intervals.

The extraction device 10 also includes a control unit 30. The present speed of the drive motors 2 and 6 can also be supplied to the control unit 30 by way of the signal lines indicated by the signal lines 35 and 36, respectively. The control unit 30 can generate control signals that are supplied to the hydraulic control 20 to bring about an extension or retraction of the hydraulic tensioning means 8 by way of the signal line 9 and to change the position of the sprocket 5 on the auxiliary drive 4 in order to tension the hanging chain out of the way. In parallel with this, the control unit 30 can also emit control signals for the drive motors 2, 6 in order to prevent hanging chain from occurring or to prevent excessively taut chain tension, by altering the respective speeds of the drive motors 2, 6.

The extraction device 10 further includes a force measuring system including at least one force measuring unit 200, which is described in greater detail with reference to FIGS. 5 to 10, at least one signal receiving unit 300, and the control unit 30. The at least one force measuring unit 200 is installed in a chain link 250, 260 of the chain strand 7, 107 for measuring the force at the individual chain link 250, 260 during operation of the extraction device 10. The signals measured by the force measuring unit 200 are sent to the at least one signal receiving unit 300. The at least one signal receiving unit 300 is positioned over the total length between the sprockets 3 and 5. In one exemplary embodiment, at least one signal receiving unit 300 may be provided at the sprocket 3, and at least one signal receiving unit 300 may be provided at the sprocket 5. Further, at least one signal receiving unit 300 may be provided at the at least one shield support, which are configured to hold the underground longwall open.

Due to the usually metallic upper and lower runs 7A, 7B, the usually metallic chain links 250, 260, and the extracted minerals, such as, for example, coal, the range of transmission of each force measuring unit 200 may be limited to, for example, about 10 m. Thus, it may be desired to provide a plurality of signal receiving units 300 for receiving signals from the at least one force measuring unit 200 passing the respective receiving unit 300. Each receiving unit 300 communicates with the control unit 30, for example, vie the lines 37, 38, 39, 40, 41, and 42, and is configured to transmit the received signals to the control unit 30 for processing.

Figure 2:
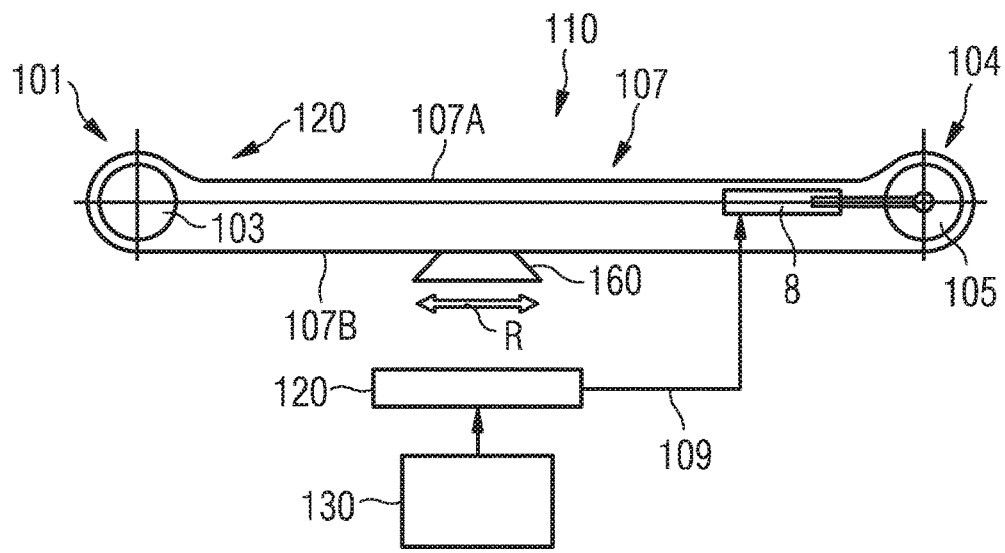
FIG. 2 schematically shows a drive frame of a drive station for the extraction device of FIG. 1, with an exemplary disclosed force measuring system.

Referring now to FIG. 2, a plow device 110 for underground mining is illustrated. An extraction plow 160 is moved back and forth, reversing from one drive station 101 to the other 104 or vice versa, as indicated by the double-headed arrow R in FIG. 2, by means of a plow chain strand 107 which is in principle endless and comprises interlinked vertical and horizontal chain links 250 and 260 (see in FIGS. 3 and 4). The drive station 101 has drive motors (not explicitly shown in FIG. 2) and a sprocket 103 for the plow chain strand 107, and the drive station 104 has a sprocket 105 and a tensioning means 108. Depending on the direction in which the plow 160 moves, one of the two drives forms a main drive and the other the respective auxiliary drive.

The plow chain strand 107 once again forms an upper run 107A and a lower run 107B which, depending on the direction R in which the plow 160 moves, form the pulling or return run. Since hanging chain and/or excessive chain tension can occur both in the outward and the return run of each sprocket 103, depending on the direction R in which the extraction plow 160 is moving, in the plow device 110, especially in a chain link 250 of the plow chain strand 107, at least one exemplarily disclosed force measuring unit 200 is provided, which will be described in more detail with respect to FIGS. 5 to 10. Contrary to the conveyor chain strand 7, the plow chain strand 107 is a single chain strand.

Although not explicitly depicted in FIG. 2, the plow device 110 is also provided with an exemplary force measuring system, such that at least one signal receiving unit 300 is positioned at the plow device 110 between the sprockets 103, 105. Each of the at least one signal receiving unit 300 may be configured to transmit the signals received from the at least one force measuring unit 200 to the control unit 130, which may process the data for deriving the force of the plow chain strand 107 at each chain link 250, 260.

The control unit 130 can generate control signals that are supplied to the hydraulic control 120 to bring about an extension or retraction of the hydraulic tensioning means 108 by way of the signal line 109 and to change the position of the sprocket 105 on the auxiliary drive 104 in order to tension the hanging chain out of the way, or to minimize the chain tension if the chain strand 107 is too slack.

Figure 3:
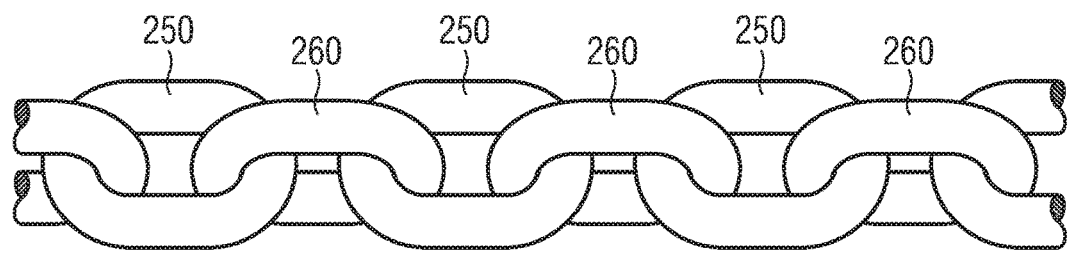
FIG. 3 shows an exemplary embodiment of a chain strand used in the chain scraper conveyor of FIG. 1 or the extraction device of FIG. 2.

FIG. 3 exemplarily shows a chain strand, which may be employed as the conveyor chain strand 7 or the plow chain strand 107. Usually, both the conveyor strand 7 and the plow chain strand 107 include alternately arranged horizontal and vertical chain links 250, 260 engaging each other.

Figure 4:
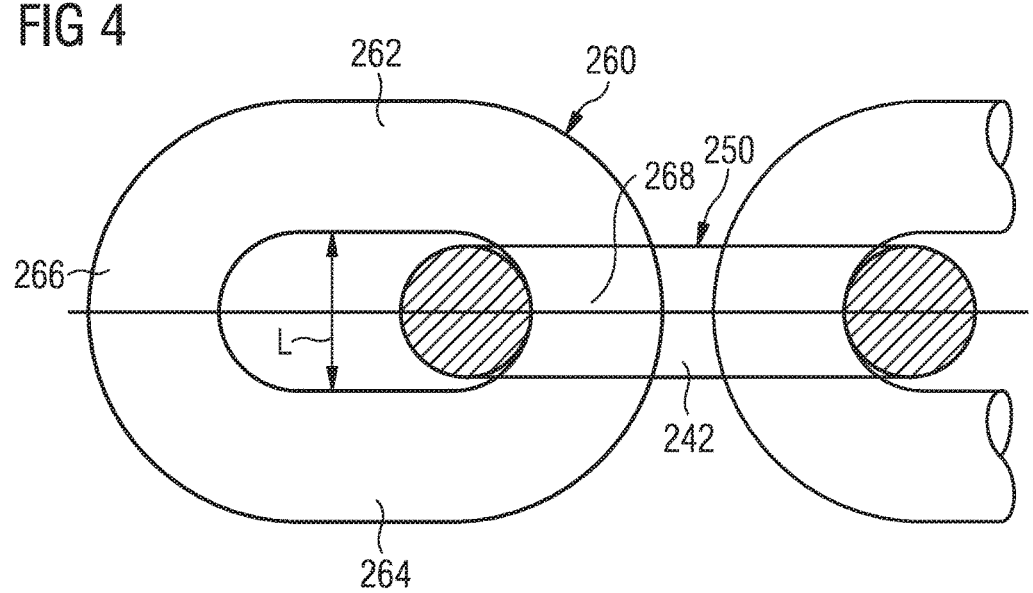
FIG. 4 illustrates an exemplary cut view through the chain strand of FIG. 3.

Referring now to FIG. 4, an exemplary cut view through an exemplary chain strand is illustrated. As shown in FIG. 4, each vertical chain link 260 includes a first chain link leg 262 and a second chain link leg 264 opposite to the first chain link leg 262. Similarly, each horizontal chain link 250 also includes a first chain link leg 252 and a second chain link leg, which is cut away in FIG. 4. The first and second chain link legs 262, 264 extend substantially in parallel to each other.

In an initial state, for example, in an unstressed state of the chain strand 7, 107 prior operation of the extraction device 10 or the plow device 110, the first chain link leg 262 is spaced apart from the second chain link leg 264 by an initial distance L. The initial distance L may be used at the reference distance for determining distance variations between the first chain link leg 262 and the second chain link leg 264 during operation of the extraction device 10 or the plow device 110.

The first chain link leg 262 and the second chain link leg 264 are connected to each other via curved sections 266 and 268, thereby forming an oval ring shaped chain link 260. Each of the first and second chain link legs 262, 264 include a circular cross-section. However, in alternative embodiments, the first and/or second chain link legs 262, 264 may include any other suitable cross-sectional shape, such as, for example, a rectangular cross-section or an oval cross-section.

With respect now to FIG. 5, a perspective view of an exemplarily disclosed force measuring unit 200 is shown.

For simplicitly only, the force measuring unit 200 in FIG. 5 is illustrated without a housing 240, which is depicted and described with reference to FIGS. 7 and 8 in greater detail. However, the housing 240 is considered to be part of the exemplary disclosed force measuring unit 200.

The force measuring unit 200 includes a distance measuring device having a first unit part 210 and a second unit part 220 opposite to the first unit part 210. As shown in FIG. 5, the first unit part 210 includes at its outer end a first contacting surface 212 configured to contact the inner surface of the first chain link leg 262, and the second unit part 220 includes at its outer end, which is opposite to the outer end of the first unit part 210, a second contacting surface 222 configured to contact the inner surface of the second chain link leg 264. Thus, the distance between the first contacting surface 212 and the second contacting surface 222 substantially corresponds to the actual distance between the first chain link leg 262 and the second chain link leg 264 (see FIG. 4).

Since the distance between first chain link leg 262 and the second chain link leg 264 varies due to the force longitudinally applied to the chain strand 7, 107, the first unit part 210 and the second unit part 220 relatively move to each other. Therefore, the distance between the first contacting surface 212 and the second contacting surface 222 continually varies in dependency to the distance between the first chain link leg 262 and the second chain link leg 264, which will be described in greater detail below.

Since the first chain link leg 262 and the second chain link leg 264 include circular cross-sections, the first and second contacting surfaces 212, 222 include curved shapes for substantially matching with the first and second chain link legs 262, 264, respectively.

FIG. 6 illustrates a cut view through the force measuring unit 200 of FIG. 5. A magnet 214, for example, a permanent magnet, is provided at the first unit part 210. The magnet 214 extends from the first contacting surface 212 towards the second contacting surface 222. Preferably, as depicted in FIG. 6, the magnet 214 is at least partially integrated within the first unit part 210. As shown in FIG. 6, the magnet 214 may be a permanent bar magnet.

The second unit part 220 includes a recess 224, which is configured to at least partially freely accommodate the magnet 214. Preferably, the recess 224 is a cylindrical bore for at least partially freely accommodating the bar magnet 214, which may be allowed to move within the recess 224, when the first and second unit parts 210, 220 move relative to each other due to a distance variation between the first and second chain link legs 262, 264.

A magnetic field sensor 226 is provided at the second unit part 220. The magnetic field sensor 226 is capable of detecting a magnetic field generated and caused by the magnet 214. Thus, the magnetic field sensor 226 is preferably provided in the vicinity of the recess 224 and, therefore, in the vicinity of the magnet 214. The magnetic field sensor 226 is in communication with a printed circuit board 228 including, for example, a processor and/or a memory for processing and at least temporarily storing the data measured by the magnetic field sensor 226.

The magnetic field sensed by the magnetic field sensor 226 depends on the relative position of the magnet 214 with respect to the magnetic field sensor 226. Specifically, the magnetic field sensor 226 may be a giant magneto-resistance sensor configured to generate an analog voltage signal indicating the corresponding magnetic field. Subsequently, the analog voltage signal is provided to an analog-to-digital converter (not shown), which processes the analog voltage signal into a digital magnetic field signal.

In some embodiments, an acceleration sensor (not explicitly shown in the drawings) may be provided at the second unit part 220, for example, at the printed circuit board 228. The acceleration sensor may detect the acceleration of the chain link 250, 260 and may provide signals indicative of the acceleration. Based on the signals indicating the sensed acceleration of the chain link 250, 260, the oscillation and vibration of the chain strand 7, 107 may be derived. Moreover, the signals indicating the acceleration of the respective chain link 250, 260 may also be considered when deriving the chain force.

In some embodiments, it is preferred to equip a chain link 250, 260 with the force measuring unit 200, at which position the plow 160 is connected to the chain strand 170. In such case, when the acceleration sensor is provided at the printed circuit board, the vibrations of the plow 160 may be detected. Then, based on the detected vibration of the plow 160, it may be determined whether the plow 160 extracts coal, hard rock, or other minerals. Hence, operation of the plow 160 may be adjusted in dependency of the determined extraction material, as it is undesired to extract, for instance, hard rock with the plow 160 suitable for extracting coal.

In addition, a temperature sensor (also not explicitly shown in the drawings) may be provided at the printed circuit board 228 to detect the temperature of the respective chain link 250, 260. The temperature sensor may provide signals indicative of the temperature of the chain link 250, 260. The signals indicating the temperature of the respective chain link 250, 260 may also be considered when deriving the chain force.

As further depicted in FIG. 6, a transmitting unit 229, such as, for instance, an antenna, is also provided at the second portion 220 and communicates with the magnetic field sensor 226 and/or the printed circuit board 228. The transmitting unit 229 is configured to wirelessly transmit the data and signals provided by the magnetic field sensor 226 and/or the printed circuit board 228 to at least one remotely disposed receiving unit 300 (shown in FIG. 1). In addition, the transmitting unit 229 may also transmit the acceleration signals and/or the temperature signals provided by the acceleration sensor and/or the temperature sensor, respectively.

It is also intended to detect and transmit the respective signals in real-time, such that the control unit 30, 130 may derive the respective load conditions of the chain strands 7, 107 in real-time. This makes it possible to adjust the operation of the extraction device 10 and/or plow device 110 in real-time based on the received signals from the at least one force measuring unit 200.

In order to provide electric power to the magnetic field sensor 226, the printed circuit board 228 with the optionally provided electric devices, and/or the transmitting unit 229, an electric power supply unit 230, for example, an accumulator, is provided at the second unit part 220.

Figure 7:
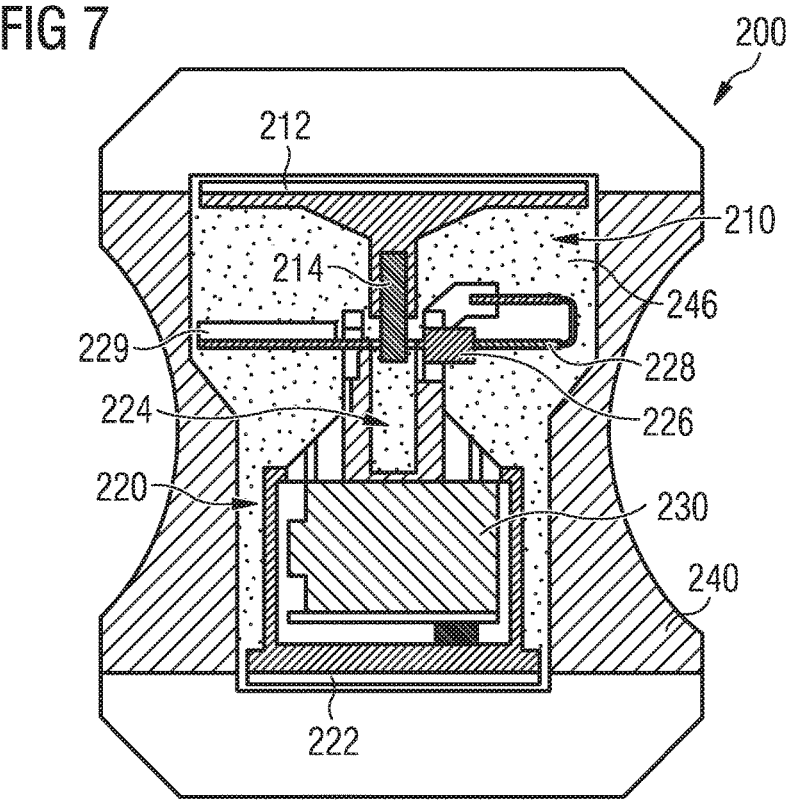
FIG. 7 shows a cut view of the force measuring unit of FIG. 5 with a housing.

Referring now to FIG. 7, the force measuring unit 200 of FIG. 6 is shown with the housing 240. Specifically, the force measuring unit 200 includes the housing 240, the distance measuring device, and a potting material 246 potted within a free space provided between the housing 240 and the distance measuring device. The distance measuring device in FIG. 7 includes the first and second unit parts 210, 220, which may measure the distance between the first and second chain link legs 262, 264 based on the magnetic field caused by the magnet 214 and measured by the magnetic field sensor 226. The first and second unit parts 210, 220 are positioned within a free space of the housing 240 and the potting material 246 (indicated as dotted portions in FIG. 7) is potted within the free space between the first and second unit parts 210, 220 and the housing 240. The potting material 246 may be an elastic two-component potting material. For example, the potting material 246 may comprise a hardness ranging from about 50 to about 100 Shore-A. The housing 240 may be an integrally casted part. In some other embodiments, the housing 240 may be a two-piece part or may consist of multi-parts connected to each other.

In some embodiments, the hardness of the potting material 246 may substantially correspond to the hardness of the housing 240, which may preferably be flexible, shock resistant, wear resistant, and tear resistant and has a high potting temperature. For example, the housing 240 and/or the potting material 246 may consist of an elastomeric material, such as, for instance, butadiene-acrylonitrile rubber, styrene-butadiene-acrylonitrile rubber, and poly-urethane rubber. The housing 240 and the potting material 246 are elastically deformable. Further, both the housing 240 and the potting material 246 may be soft enough to allow a relative movement between the first and second chain link legs 262, 264, but strong enough to stay fixedly installed within the chain link 250, 260 during operation of the underground mining machine, such that the force measuring unit 200 may not fall out of the chain link 250, 260. The potting material 246 may be configured to relatively position the first and second unit parts 210, 220 within the housing 240.

Figure 8:
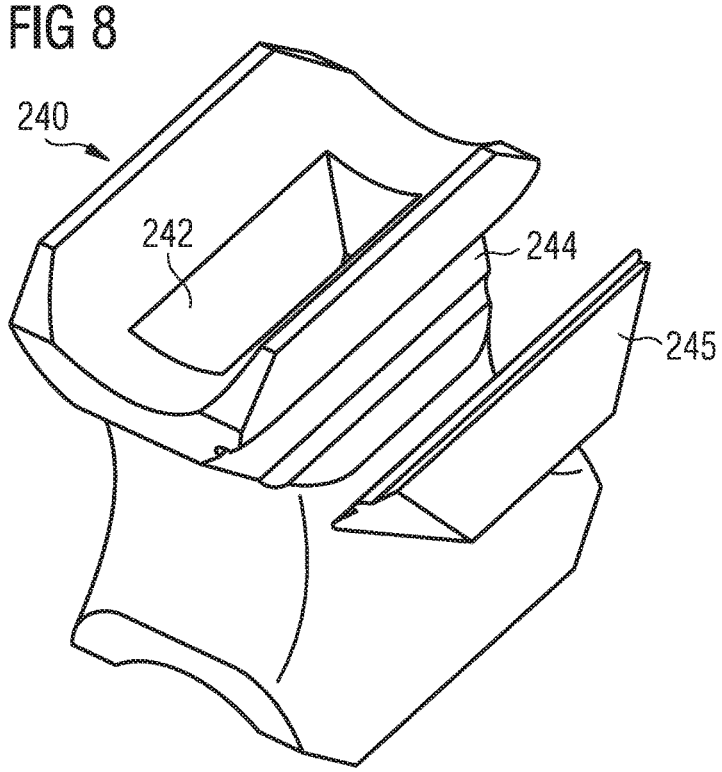
FIG. 8 shows an exemplary housing of the force measuring unit of FIG. 5.

With further reference to FIG. 8, it can be seen that the housing 240 includes a first opening 242, through which the first contacting surface 212 at least partially extends to contact the first chain link leg 262. Opposite to the first opening 242, a second opening (not explicitly shown in FIG. 8) is provided, through which the second contacting surface 222 at least partially extends to contact the second chain link leg 264. By means of the potting material 246, it is ensured that the first and second unit parts 210, 220 cannot inadvertently fall out of the housing 240 and that the first and second contacting surfaces 212, 222 are positioned relative to the housing 240, such that the first and second contacting surfaces 212, 22 may contact the first and second chain link legs 262, 264, respectively.

In the following, an exemplary manufacturing process of an exemplary disclosed force measuring unit 200 is described in greater detail. First, the first and second unit 210, 220 are positioned within the free space provided in the housing 240. Particularly, the first unit part 210 is inserted into the housing through the first opening 242, and the second unit part 220 is inserted into the housing through the second opening. In this state, the magnet 214 is at least partially positioned within the recess 224 and the complete electric devices, such as the electric power supply 230 and the respective electric wiring, are also placed and positioned within the housing 240.

Then, the potting material 246 is firstly potted from above through the first opening 242 into the free space between the housing 240 and the first and second unit parts 210, 220. Subsequently, the potting material 246 is potted from below through the second opening into the free space between the housing 240 and the first and second unit parts 210, 220, such that the first contacting surface 212 and the curved outer surface of the housing 240 at the first opening 242 are leveled, and that the second contacting surface 222 and the curved outer surface of the housing 240 at the second opening are leveled.

For installing and de-installing the force measuring unit 200 to and from the chain links 250, 260, the housing 240 includes a recess 244, into which a fitting element 245 can be placed for filling the recess 244. Hence, the shape of the recess 244 and the shape of the fitting element 245 substantially match each other. Due to the recess 244, a housing lip 243 is formed, which may be at least partially elastic when the fitting element 245 is de-installed. In FIG. 8, the recess 244 and the fitting element 245 are illustrated in a wedge shape. However, both are also intended to be provided in any other suitable shape matching each other.

In other embodiments, the fitting element 245 may include the housing lip 243. In such case, the housing 240 can be easily placed within the chain link 250, 260 and, then, for securing the housing 240 to the chain link, the fitting element 245 can be fixed to the respective portion.

The installation and de-installation process of the force measuring unit 200 is described in greater detail with reference to FIGS. 9 to 11. Referring to FIG. 9, to install the force measuring unit 200 in, for example, a vertical chain link 260, the force measuring unit 200 is firstly positioned, such that the first contacting surface 212 of the first unit part 210 and the first end portion of the housing 240, which does not include the recess 244, contacts the inner surface of the first chain link leg 262. In this state, the second end portion of the housing 240, which includes the recess 244, is outside the chain link 260.

Then, by providing and rotating a specific installation tool 400 in a counter-clockwise direction, the housing lip 243 may be folded away and give access for the second unit part 220 into the portion between the first chain link leg 262 and the second chain link leg 264. Particularly, the housing lip 243 may fold into the recess 244. Afterwards, as can be seen in FIG. 10, due to the elasticity of the housing lip 243, the housing lip 243 may fold back in its initial state. Then, the force measuring device 200 is completely installed in the chain link 260 between the first and second chain link legs 262, 264.

Finally, regarding FIG. 11, to prevent the force measuring unit 200 from falling out of the chain link 260, in particular to prevent the housing lip 243 to re-fold into the recess 244, the fitting element 245 is mounted into the recess 244, for example, by glueing, welding, or soldering. In other words, the fitting element 245 is configured to backfill the recess 244 and, thus, to strengthen the housing 240.

In the installed state, the force measuring unit 200, especially the first and second unit parts 210, 220, is supported and held by the first and second chain link legs 262, 264. In some embodiments, the force measuring unit 200 is at least partially clamped between the first and second chain link legs 262, 264.

In some embodiments, for example, in the pre-stressed state of the chain stands 7, 107, the relative position of the magnet 214 to the magnetic field sensor 226 may define the initial magnetic field, which may be the basis for calculating and deriving the magnetic field change caused by a movement of the magnet 214 within the recess 224 relative to the magnetic field sensor 226. Alternatively, the initial magnetic field may be defined by the position of the magnet 214 relative to the magnetic field sensor 226, when the chain strand 7, 107 is in an unstressed state, for instance, when the chain strand 7, 107 is not tensioned by the tensioning means 8, 108.

Figure 12:
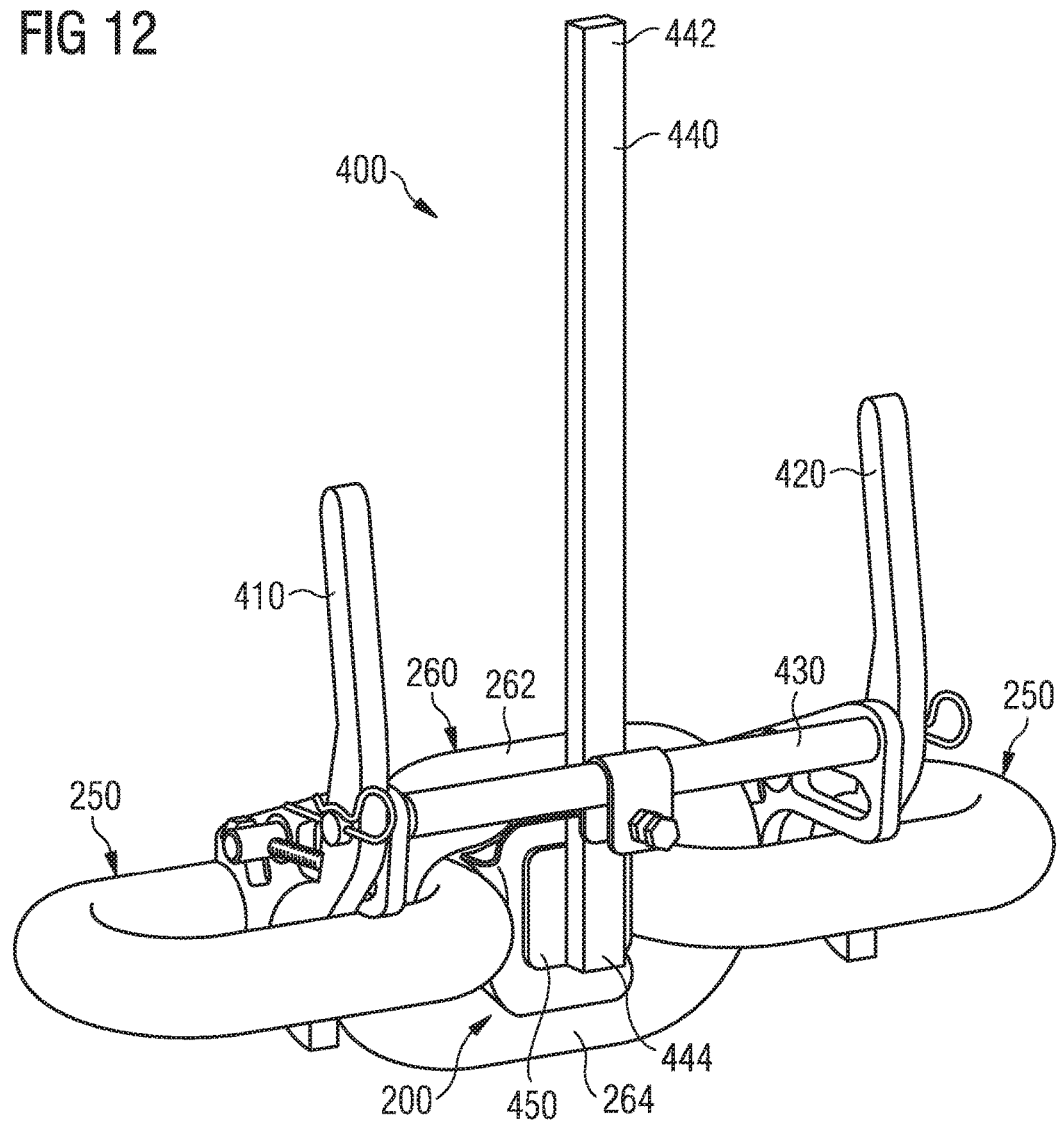
FIG. 12 shows an exemplary disclosed installation tool for mounting a disclosed force measuring unit to a chain link.

Referring to FIG. 12, an exemplary embodiment of the installation tool 400 is illustrated in greater detail. The installation tool 400 includes a first supporting element 410 and a second supporting element 420 spaced apart the first supporting element 410. As shown in FIG. 12, the first supporting element 410 engages a horizontal chain link 250 and the second supporting element 420 engages another horizontal vertical chain link 250. The first and second supporting elements 410, 420 are preferably clamped preferably to the horizontal chain links 250 by the principle of a toggle lever hinge. In some embodiments, the installation tool 400 may only comprise one supporting element configured to engage an adjacent chain link.

Figure 13:
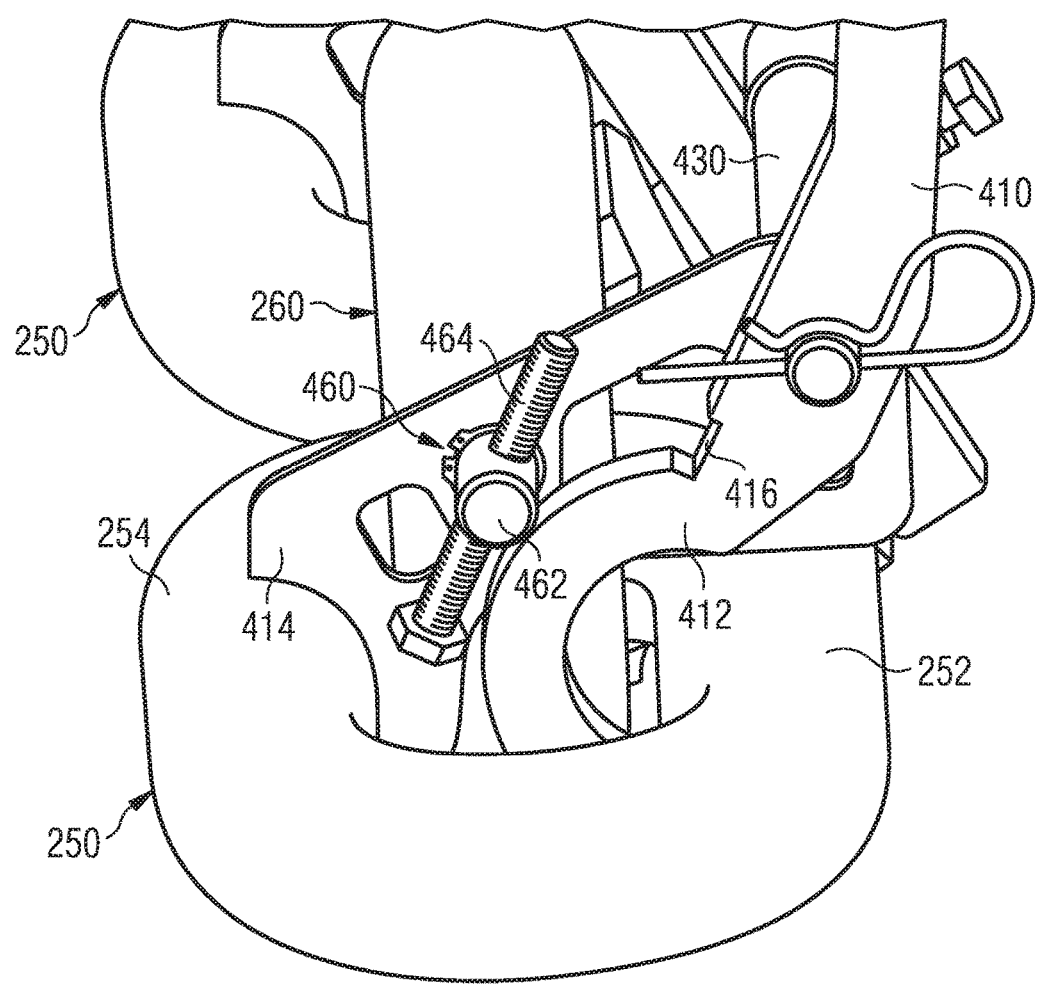
FIG. 13 shows a detail view of a supporting element of the installation tool of FIG. 12.

With respect to FIG. 13, the specific attachment of the first supporting element 410 to the horizontal chain link 250 is shown in detail. The first supporting element 410 includes a first engaging part 412 configured to engage the first chain link leg 252, and a second engaging part 414 configured to engage the second chain link leg 254. By rotating the lever of the first supporting element 410, the first and second engaging parts 412, 414 engage the first and second chain link legs 252, 254.

A locking means 460 including a rotating element 462 and, for example, a bolt 464 is provided at the first and second supporting elements 410, 420, respectively. After engagement of the first and second engaging parts 412, 414 with the first and second chain link legs 252, 254, respectively, the bolt 464 is brought into contact with a locking surface 416 provided at the second engaging part 412. Therefore, rotation of the first and second engaging parts 412, 414 is locked and the first supporting element 410 is attached to the chain link 250. Similarly, attachment of the second engaging element 420 is perfomed.

The first and second supporting elements 410, 420 are connected to each other via a shaft 430 rotatably supported by the first and second supporting elements 410, 420. Connected to the shaft 430 is a lever 440 having a first end 442 which is gripped by, for instance, an operator's hand, and a second end 444 to which a pressing element 450 is attached.

As illustrated in FIG. 12, the lever 440 is centrally disposed between the first and second supporting elements 410, 420, such that an exemplary disclosed force measuring unit 200 may be mounted to a vertical chain link 260 engaging adjacent horizontal chain links 250, to which the first and second supporting elements 410, 420 are attached.

By rotating the lever 440, torque is applied to the pressing element 450, which presses the force measuring unit 200 into the free portion between the first and second chain link leg 262, 264 of the vertical chain link 260.

In some embodiments, the installation tool 400 may include hydraulic, pneumatic and/or electric devices for installing the force measuring unit 200 into the chain link 250, 260. In such embodiment, for example, instead of providing the lever 440, the hydraulic, pneumatic and/or electric devices may be supported at the shaft 430 for pressing the force measuring unit 200 into the chain link 250, 260.

INDUSTRIAL APPLICABILITY

In the following, operation of the exemplarily disclosed force measuring unit 200 and an exemplarily disclosed force measuring system provided at the extraction device 10 or the plow device 110 is described with respect to FIGS. 1 to 12.

At first, a plurality of force measuring units 200 are mounted to individual horizontal and/or vertical chain links 250, 260 of the conveyor chain strand 7 and/or the plow chain strand 107. For example, one force measuring unit 200 may be mounted to each, or to each fifth, tenth, or twentieth vertical and/or horizontal chain link 250, 260. Further, as can be seen in FIG. 1, a plurality of signal receiving units 300 may be positioned between the sprockets 3 and 5. It is also intended to have a signal receiving unit 300 at each fifth, tenth, or twentieth meter for receiving the signals transmitted by the plurality of force measuring units 200. The quantity of signal receiving units 300 may also depend on the quantity and the range of transmission of the force measuring units 200 and whether the chain force shall be measured in real-time. If the chain force may not be measured in real-time, it may be sufficient to pre-store the measured data at the respective force measuring unit 200 and transmit the signals to a signal receiving unit 300 provided at, for example, the driving stations 1, 4.

Then, in an unstressed state of the chain strands 7, 107, the magnetic field sensor 226 measures a first initial magnetic field MF01, which corresponds to the no-force state of the chain strand 7, 107 and forms the basis for subsequent calculations. Subsequently, after tensioning the chain strand 7, 107 by the tensioning means 8, 108, the magnetic field sensor 226 measures a second initial magnetic field MF02, which corresponds to the pre-stressed state of the chain strand 7, 107. Preferably, the second initial magnetic field MF02 is measured when the chain link 250, 260 equipped with an exemplary disclosed force measuring unit 200 is disposed right in front of the main driving sprocket 3 relative to the driving direction F (see, for instance, FIG. 1).

The first initial magnetic field MF01 and the second initial magnetic field MF02 define a straight line in a diagram, in which the X-axis denotes the magnetic field and the Y-axis denotes the force at the respective chain link 250, 260. Hence, the magnetic field is directly proportional to the force at the respective chain link 250, 260.

The magnetic field sensor 226 continually measures the magnetic field caused by the magnet 214, which moves relatively to the magnetic field sensor 226 based on the distance variations between the first chain link leg 262 and the second chain link leg 264.

Regarding FIG. 4, when a longitudinal force is applied to the chain strands 7, 107, the distance between the curved portions 266, 286 may decrease, which leads to a distance variation between the first chain link leg 262 and the second chain link leg 264. Particularly, the distance L between the first chain link leg 262 and the second chain link leg 264 may be reduced.

Thus, the magnet 214 may move relative to the magnetic field sensor 226, which in turn may detect a magnetic field. Subsequently, the magnetic field sensor 226 provides a signal indicative of the magnetic field to the processor at the printed circuit board 228. Specifically, the processor provided at the printed circuit board 228 may process the signals, for example, calculate the force at the respective chain link 250, 260, which corresponds to the measured magnetic field, based on the diagram generated prior operation.

Then the processor may provide the signals indicative of the magnetic field to the transmitting unit 229, which in turn may transmit these signals to the one of the plurality of signal receiving units 300 being closest to the respective antenna 229, i.e. which is in the range of transmission of the transmitting unit 300. When the signals are received by the respective signal receiving unit 300, the signals may be provided to the control unit 30 for further processing the signals.

Alternatively, in the case of a small number of signal receiving units 300 or in the case that a signal receiving unit 300 is temporarily not in the range of transmission of the force measuring unit 200, the processor at the printed circuit board 228 may at least temporarily store the processed signals in the memory. Then, when any one of the plurality of signal receiving units 300 is again in the range of transmission of the force measuring unit 200, the signals stored in the memory are transmitted to the available signal receiving unit 300.

In some other embodiments, the force measuring unit 200 may be configured to directly transmit the signals indicative of the magnetic field measured by the magnetic field sensor 226 to an available signal receiving unit 300. In such case, at least one of the signal receiving unit 300 and the control unit 30 processes the received signals for deriving the force at the respective chain link 250, 260. This may reduce the electric power usage at the force measuring unit 200, as in such case no processor is required at the force measuring unit 200.

The control unit 30 is configured to process the signals received from each force measuring unit 200. It is desired and intended that the control unit 30 derives the distance change between the first and second chain link legs 262, 264 based on the received signals indicative of the magnetic field sensed by the respective magnetic field sensor 226. The control unit 30 may derive and calculate the distance change between the first and second chain link legs 262, 264 with an accuracy of, for instance, about 0.01 mm to about 0.001 mm.

Subsequently, based on the signals indicating the magnetic field present at the respective chain link 250, 260, the control unit 30 may derive the force at the respective chain link 250, 260. Based on the plurality of derived load conditions at the plurality of chain links 250, 260 equipped with the disclosed force measuring device 200, the control unit 30 may derive the load condition of the whole chain strand 7, 107. For example, in the case of 50 force measuring units 200 symmetrically arranged at the chain strands 7, 107, the control unit 30 may be able to derive 50 forces at the respective chain link positions and may then provide output indicating the load condition of the whole chain strand 7, 107.

In some embodiments, the magnetic field sensor 226 additionally records the time at which each signal indicating the measured magnet field is sensed. Then, based on the operation starting time, the chain strand speed, the distance between the sprockets 3, 5, and the diameters of the sprockets 3, 5, the control unit 30 may further determine the position of each chain link 250, 260 equipped with the exemplary disclosed force measuring system 200 by based on the recorded time. This further enables the control unit 30 to better evaluate the chain strand load condition in dependency of the respective position.

For instance, if at least one load condition determined at the respective chain link 250, 260 exceeds a predetermined force threshold for the respective position, the extraction device 10 may be stopped due to a high risk of tearing of the chain strand 7, 107. Alternatively, the tensioning means 8, 108 may be controlled to at least partially relief the tension of the chain stands 7, 107.

To the contrary, if at least one specific load condition determined at the respective chain link 250, 260 falls below a predetermined force threshold for the respective position, it may be determined that the chain strand 7, 107 is hanging at the respective chain link position and, hence, a signal may be provided to the tensioning means 8, 108 to re-tension the chain strand 7, 107.

Further Aspects

In the following, further aspects of the present disclosure are described. Those aspects include features already described herein in connection with the above description and FIGS. 1 to 13.

According to a further aspect, a force measuring unit for measuring a force applied to an individual chain link of an endless chain strand running as an endless chain strain about two drive sprockets used in underground mining applications, the chain strand including a plurality of chain links engaging each other, each chain link having a first chain link leg and a second chain link leg opposite to the first chain link leg, the force measuring unit comprising:

a housing having a first end configured to be contacted by the first chain link leg and a second end configured to be contacted by the second chain link leg, such that the housing is at least partially clamped between the first chain link leg and the second chain link leg, the housing being elastically deformable such that a distance variation between the first chain link leg and the second chain link leg is possible; and a distance measuring device accommodated within the housing and configured to measure an actual distance between the first chain link leg and the second chain ling leg, the distance measuring device including a first unit part configured to be contacted by the first chain link leg and a second unit part configured to be contacted by the second chain ling leg, wherein, due to the distance variation between the first chain link leg and the second chain ling leg caused by the force applied to the chain strand, the first unit part and the second unit part relatively move to each other, such that the actual distance between the first and second chain link legs can be measured According to a further aspect, an installation tool for mounting a force measuring unit to a first chain link of a chain strand including a plurality of chain links engaging each other and used in underground mining applications may comprise:

a first supporting element configured to engage a second chain link engaging the first chain link;

a second supporting element configured to engage a third chain link engaging the first chain link;

a shaft rotatably supported by the first and second supporting elements; and a lever attached to the shaft and configured to apply a force to the force measuring device when being rotated about the shaft, thereby fitting the force measuring unit into the first chain link.

In an embodiments, the first supporting element includes a first engaging part configured to contact and match with the first chain link leg of the first chain link, and a second engaging part configured to contact and match with the second chain link leg of the first chain link.

In some embodiments according to the above aspects, the installation tool further comprises a locking means provided at one of the first and second engaging parts, the locking means being configured to lock the first and second locking parts in an engagement position, in which the first and second engaging parts contact and match with the first and second chain link legs of the first chain link, respectively.

In some embodiments, the lever includes a first end configured to be gripped by an operator and a second end including a pressing element configured to contact and press the force measuring unit into the chain link.

According to a further aspect, a force measuring unit for measuring a force applied to an individual chain link of a chain strand used in underground mining applications, the chain strand including a plurality of chain links engaging each other, each chain link having a first chain link leg and a second chain link leg opposite to the first chain link leg, the force measuring unit (200) comprising:

a first unit part configured to be contacted by the first chain link leg;
a magnet provided at the first unit part;
a second unit part configured to be contacted by the second chain link leg; and
a magnetic field sensor provided at the second unit part and configured to detect a magnetic field caused by the magnet,
wherein, due to a distance variation between the first chain link leg and the second chain link leg caused by the force applied to the chain stand, the first unit part relatively moves with respect to the second unit part, such that the magnet moves relatively to the magnetic field sensor causing a variation of the detected magnetic field.

According to a further aspect, a housing configured to accommodate a distance measuring unit for measuring a distance variation between a first chain link leg and a second chain link leg, may comprise:
a first end configured to be contacted by the first chain link leg;
a second end configured to be contacted by the second chain link leg; and
a free space between the first and second ends and configured to accommodate the distance measuring device,
wherein the housing is elastically deformable such that a distance variation between the first chain link leg and the second chain link leg is possible.

In some embodiments, the housing is an integrally formed housing. In alternative embodiments, the housing may be a two-part housing or a multi-part housing.

In some embodiments, the first end of the housing may include a curved surface for matching with the first chain link leg and/or the second end of the housing may include a curved surface for matching with the second chain link leg, such that the housing is supported and safely positioned within the chain link.

Although the preferred embodiments of this invention have been described herein, improvements and modifications may be incorporated without departing from the scope of the following claims.

The invention claimed is:

1. A force measuring unit for measuring a force applied to an individual chain link of a chain strand used in underground mining applications, the chain strand including a plurality of chain links engaging each other, each chain link of the plurality of chain links having a first chain link leg and a second chain link leg opposite to the first chain link leg, the force measuring unit comprising:
a housing having a first end configured to be contacted by the first chain link leg and a second end configured to be contacted by the second chain link leg, the housing being elastically deformable such that a distance variation between the first chain link leg and the second chain link leg is possible;
a distance measuring device accommodated within the housing and configured to measure an actual distance between the first chain link leg and the second chain link leg, the distance measuring device including a first unit part configured to be contacted by the first chain link leg and a second unit part configured to be contacted by the second chain link leg;
a magnet provided at the first unit part; and
a magnetic field sensor provided at the second unit part and configured to detect a magnetic field caused by the magnet,
wherein, due to the distance variation between the first chain link leg and the second chain link leg caused by the force applied to the chain strand, the first unit part and the second unit part move relative to each other, such that the actual distance between the first and second chain link legs can be measured, and
wherein, due to the relative movement between the first unit part and the second unit part, the magnet moves relative to the magnetic field sensor causing a variation of the detected magnetic field.

2. The force measuring unit of claim 1, further comprising a potting material potted within a free space provided between the housing and the first and second unit parts positioned within the housing.

3. The force measuring unit of claim 1, wherein the second unit part includes a recess configured to at least partially accommodate the magnet.

4. The force measuring unit of claim 1, further comprising a processor configured to receive and process signals provided by the distance measuring device.

5. The force measuring unit of claim 4, further comprising a memory configured to at least temporarily store data processed by the processor.

6. The force measuring unit of claim 1, further comprising an electric power supply configured to provide electric power to the distance measuring device.

7. The force measuring unit of claim 1, further comprising a transmitting unit configured to transmit signals provided by the distance measuring device to a signal receiving unit remotely disposed with respect to the force measuring unit.

8. The force measuring unit of claim 2, wherein at least one of the housing and the potting material includes an elastomeric material.

9. The force measuring unit of claim 1, wherein the housing includes a recess configured to accommodate a filling element matching with the recess, when the force measuring unit is mounted to a chain link of the plurality of chain links.

10. The force measuring unit of claim 1, further comprising: at least one of an acceleration sensor configured to detect an acceleration of the chain link; and a temperature sensor configured to detect a temperature of the chain link.

11. A chain force measuring system for measuring a chain force of a chain strand of an extraction device or a plow device used in underground mining applications, the chain force measuring system comprising:
at least one force measuring unit in accordance with claim 1, the at least one force measuring unit being mounted to a chain link of the chain strand;
at least one signal receiving unit configured to receive signals from the at least one force measuring unit; and
a control unit communicating with the at least one signal receiving unit and configured to process the signals provided by the at least one signal receiving unit for deriving the chain force.

12. An extraction device for mining the extraction device comprising:
a first drive station including a first sprocket;
a second drive station spaced apart from the first drive station and including a second sprocket;
at least one chain strand including a plurality of chain links engaging each other and running around the first sprocket and the second sprocket to form an upper run and a lower run; and
a chain force measuring system in accordance with claim 11.

13. The extraction device of claim 12, further comprising a tensioning means for tensioning the at least one chain strand by changing the distance between the first sprocket and the second sprocket in dependency on the derived chain force.

14. A method for determining a force of at least one chain link of a chain strand including a plurality of chain links engaging each other, each chain link having a first chain link leg and a second chain link leg opposite to the first chain link leg the method comprising:
- transferring a distance variation between the first chain link leg and the second chain link leg into a relative movement between a magnet coupled to the movement of the first chain link leg and a magnetic field sensor coupled to the movement of the second chain link leg;
- measuring a magnetic field caused by the magnet; and
- based on the measured magnetic field, deriving the force at the at least one chain link.

* * * * *